3,152,107
POLYETHYLENE CROSSLINKING PROCESS
Michel E. Mullier, Takoma Park, and Richard A. Bafford, Baltimore, Md., assignors to W. R. Grace & Co., New York, N.Y., a corporation of Connecticut
No Drawing. Filed Feb. 1, 1961, Ser. No. 86,298
9 Claims. (Cl. 260—94.9)

This invention relates to a method of crosslinking olefin polymers using a novel class of crosslinking agents. Additionally, this invention relates to a novel premixed homogeneous polymer composition capable of forming crosslinked polymer products in desirous shapes by methods well known in the art. More particularly, this invention is concerned with blending a novel class of crosslinking agents with molten polyethylene, forming the molten polymer in a desired shape by extrusion, molding or the like and thereafter subjecting the thus-formed polymer to a curing step at temperatures where the novel crosslinking agents decompose.

Polymers of ethylene such as those described in U.S. 2,153,553 and in U.S. 2,816,883 are well known in the art today and are generally characterized by their organic solvent solubility and their thermoplastic properties. Lately, several methods have been tried with varying success to decrease their thermoplasticity and solubility by crosslinking the polymer. Such methods include impingement of electrons on the polymer and blending of free radical precursors into the polymer. In regard to the aforesaid latter method of polymer crosslinking the main classes of compounds which have been utilized as crosslinking agents are organic peroxides and bisperoxides. Although it is known that various organic peroxides will cause crosslinking upon admixture with polyethylene, many have been found lacking in certain regards. Thus, for example, the use of benzoyl peroxide at the necessary blending temperatures is hazardous because the mixture may decompose violently. This and other peroxides have such a short half-life at the temperatures of incorporation into the softened ethylene polymer that crosslinking occurs during the mixing process, and the resulting crosslinked resin cannot be formed into commercially useful shapes.

The advent of high density polyethylene, i.e., 0.94–0.97, described in U.S. 2,816,883 which has a melting point of at least 127° C. created many problems in the crosslinking art. One of these problems has been the need for a crosslinking agent which can be incorporated into a molten ethylene polymer prior to or during a shaping operation, e.g., extrusion, without decomposing and which would, after shaping, cause crosslinking of the polymer in a curing operation at higher temperatures. The high melting point of the high density ethylene polymer makes it impossible to use peroxides now well known in the art as crosslinking agents. This is due to these peroxides having an excessive decomposition rate at the softening point of the ethylene polymer thereby crosslinking the polymer to a high degree so rapidly that mixing, molding, or extruding operations are impossible on a commercial scale.

It has now been found that arylazoalkylcarboxamides of the formula:

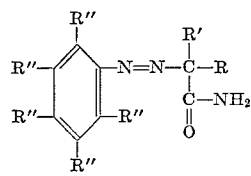

wherein R″ is a member of the group consisting of hydrogen, halogen, alkyl, aralkyl, aryl and any combination thereof, and R and R′ are alkyls but not necessarily the same alkyl and can be joined to form a saturated carbocyclic group, e.g., as in the compound, 1-phenylazocycloheptyl-1-carboxamide,

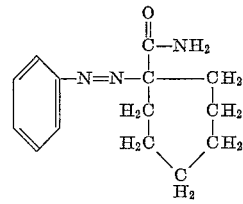

are effective crosslinking agents capable of admixture with polyethylene (even high density polyethylene) above its softening point, which can cause crosslinking thereof after shaping, in a subsequent curing operation at higher temperatures.

The rate of decomposition of these novel compounds and thus, the rate of crosslinking obtained by the use of these compounds, is a function of the electrophilicity (acidity in the Lewis Theory of acids) of the functional groups adjacent to the azo linkage. The relative thermal stability of the crosslinking compounds at any given decomposition temperature can be predicted from the electrophilicity of the functional group since the thermal stability of the crosslinking compounds is inversely proportional to the electrophilicity of the functional group. For example:

Increasing thermal stability ⟶

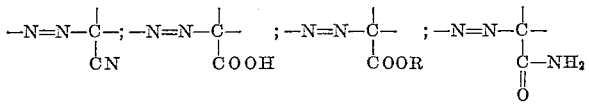

Decreasing electrophilicity ⟶

Hence the phenylazoalkylnitriles decompose faster than the corresponding phenylazoalkylcarboxamides since the nitrile group is more electrophilic than the amide group. This is more clearly shown in Table I infra. Therefore, at any given temperature, one skilled in the art could obtain the desired decomposition rate for these novel arylazoalkyl compounds merely by substituting various functional groups, such as nitriles, carboxylic acids, sulfonic acids, halogens, esters, amides, etc. adjacent to the azo linkage.

Due to their uniform dispersion in the polymer these arylazoalkyl compounds promote crosslinking to a high degree at curing temperatures in the range 180–250° C. and even higher. Even lower curing temperatures, e.g., 140–180° C. are operable, but since the rate of crosslinking is a function of temperature above the decomposition temperature, the higher the curing temperature the greater the degree of crosslinking in any given time period. Obviously, higher curing temperatures, e.g. 180–240° C. or higher will be used in commercial practice in order to decrease the time cycle. The crosslinked polymer exhibits greatly improved environmental stress cracking properties which will be shown in the examples hereinafter.

The arylazoalkyl compounds of the instant invention can, if desired, be admixed with the polyethylene at room temperature prior to heating the mixture above the melting point of the polymer. However, for ease of handling, the arylazoalkyl compounds are admixed with the polymer in its molten state.

The crosslinking agent of the instant invention operates equally as well with low density polyethylene having a melting point in the range 105–110° C. as with high density polyethylene having a melting point of at least 127° C. However, since many peroxides well known in the art are operable with low density polyethylene the real crux of the invention is the discovery of a crosslinking agent operable with high density polyethylene in the manner disclosed herein.

In one aspect, therefore, in summary the invention provides a method of crosslinking polyethylene and especially high density polyethylene which comprises admixing a minor amount of arylazoalkylcarboxamides of the formula:

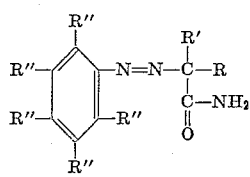

wherein R″ is a member of the group consisting of hydrogen, halogen, alkyl, aralkyl, aryl and any combination thereof, and R and R′ are alkyls but not necessarily the same alkyl and can be joined to form a saturated carbocyclic group, with a fused polymer of ethylene, forming said arylazoalkylcarboxamide-fused polymer composition into a desired shape and thereafter heating the shaped composition at a temperature above 140° C. for a time sufficient to crosslink the polymer.

The following examples are set down to illustrate the invention and are not to be deemed as limiting its scope.

Throughout the instant invention the melt indices (MI) were measured under the conditions specified in ASTMD 1238-52T; the densities of the polymer were measured in a density gradient tube by the Bell Laboratories Proposed ASTMD method for the Measurement of Density of Solid Plastics by the Density Gradient technique; and the environmental stress cracking data (ESC) was obtained using Igepal CO–630 (Antarox A400), an alkylaryl polyethylene glycol produced by General Dyestuff Corp., in accordance with the Proposed Tenative Method of Test for Environmental Stress-Cracking of Type 1 Ethylene Plastics (ASTM Designation: DOO–59T) as disclosed in the 1959 preprint of the Report of Committee D–20 on Plastics, pp. 17–22, at the 62nd Annual Meeting of the ASTM, June 21–26, 1959.

In all examples, unless otherwise noted, a Brabender Plastograph Model PL–V2 equipped with a recording unit for measuring changes in torque was used both for mixing the reactants and determining the degree of crosslinking. The aforesaid recording unit had a range of 0–1000 units equal to 0–1 kilogram-meter of torque. This range can be increased when necessary to 0–5000, i.e., equal to 0–5 kilogram-meters of torque by the addition of weights. However, other mechanisms, e.g., a Banbury mixer or a tape extruder, are equally operable in performing this invention.

The degree of crosslinking is related to the change in torque measured by the Plastograph recorder from the time the crosslinking agent is added to the fused polymer until the reaction is discontinued either prematurely or because maximum torque has been achieved. The change in torque where maximum torque is obtained is designated as $\Delta\tau$max. $\Delta\tau$ will be used when the reaction is not carried to completion. The greater the degree of crosslinking the greater the viscosity of the polyethylene which in turn requires a greater torque in order to drive the Plastograph at a constant r.p.m. The degree of crosslinking which can be accomplished by the instant invention is limited only by the ability of the mixing apparatus to overcome the torque caused by the crosslinking.

In the instant invention for the given concentrations and conditions employed, the rate of crosslinking is equal to the increase in torque $\Delta\tau$ from the time the crosslinking agent is added to the fused polymer until the reaction is discontinued divided by the time interval ($t$) therebetween. Thus, when the reaction is carried to completion and the maximum torque obtainable is achieved, the rate of crosslinking is equal to $\Delta\tau$max./$t$. A large value of $\Delta\tau$max./$t$ indicates that the crosslinking agent decomposes very rapidly and thus, may prove inoperable in a commercial shaping operation. A small value of $\Delta\tau$max./$t$ shows that the decomposition rate of the crosslinking agent is slow, thus allowing the shaping operation to be completed prior to fully crosslinking the polymer in a subsequent curing step. When the reaction is precluded prematurely in order to subject the polymer to a subsequent curing step at higher temperatures, the rate of crosslinking is equal to $\Delta\tau/t$.

A further check on the degree of crosslinking is the decrease in melt index due to crosslinking of the polyethylene. Since melt index varies inversely with viscosity, which in turn varies directly with degree of crosslinking, a lower melt index after treatment of a polymer shows that crosslinking occurred.

Still another method used to tell whether or not the polymer in a milling or extrusion operation is crosslinked or not, is the color of the polymer product. The crosslinking agents of the instant invention are of a brownish-yellow color which color is imparted to the polymer product even when the crosslinking agents are used in minor amounts. However, when these crosslinking agents decompose in the polymer they become colorless with the result that the molten polymer product is white on cooling. Thus, a visual test of whether the polymer product is crosslinked is readily available.

Unless otherwise noted, all parts and percentages are by weight in the examples.

To insure maximum efficiency of the crosslinking agents of the instant invention, all the milling was done in an inert atmosphere, i.e., nitrogen. Other gases, e.g., the noble gases, and especially argon, are equally suitable as inert atmospheres.

EXAMPLE 1

36 g. commercial polyethylene in pellet form, having a melt index of 0.7 and a density of 0.96 were milled under a nitrogen blanket on a Brabender plastograph until molten at a temperature in the range 173–175° C. After a constant torque was recorded, 1 ml. of a benzene solution containing 0.0382 g. of 2-phenylazoisobutyramide,

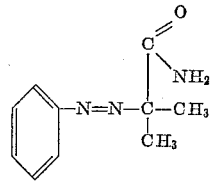

was added as a crosslinking agent to the molten polymer under nitrogen and milling continued. $\Delta\tau/t$ (meter-grams/min.) measured as the change in torque from the time the cross-linking agent was added until the reaction was discontinued was 2 meter-grams/min.

The polyethylene product was then subjected to a subsequent curing step by being pressed in a Carver press at 400° F. and 10,000 p.s.i. for 105 mins. The thus-cured product whose melt index was 0.00 when tested for resistance to environmental stress cracking (ESC) by the test referenced supra endured 44 hours. A control polyethylene sample of 0.7 melt index and 0.96 density after pressing on a Carver press for 15 minutes at 10,000 p.s.i. and 350° F. endured ESC test for 25 hours.

A similar run (325-23-254) using the same reactants at a Brabender milling temperature of 203° C. resulted in a $\Delta\tau/t$ of 5 meter-grams/min. The milled product had a melt index of 0.185. The milled product was then cured at 10,000 p.s.i. and 400° F. for one hour. The melt index of the cured product was 0.022.

EXAMPLE 2

36 g. commercial polyethylene in pellet form having a density of 0.96 and a melt index of 0.7 were charged under nitrogen to a Brabender Plastograph maintained at 173° C. Milling was continued until a constant torque was recorded indicating that the polymer charge was molten. 1 ml. of a benzene solution containing 0.046 g. of 2-phenylazo-2,4,4-trimethylvaleramide,

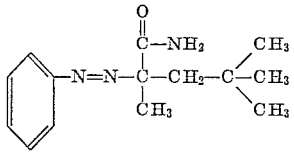

was added under nitrogen to the molten polymer and milling continued. $\Delta\tau/t$ was 7.5 meter-grams/min. The polyethylene product was yellow and had a melt index of 0.447 uncured.

After curing at 10,000 p.s.i. and 400° F. for 15 minutes the polymer was white and had a melt index of 0.00.

The following table shows the thermal stability of the crosslinking agents of the instant invention over a peroxide and bisperoxide well known in the art at temperatures above the melting point of high density polyethylene, i.e. about 140° C.

*Table I*

| Run No. | Crosslinking Agent | Moles ×10⁻⁴ [1] | Milling Temp., ° C. | $\Delta\tau$ max./t meter-gram min. |
|---|---|---|---|---|
| 325-20-249 | Dicumyl peroxide | 2.0 | 203-217 | 296 |
| 325-16-239 | Dicumyl peroxide | 2.0 | 176-201 | 238 |
| 325-20-248 | 2,5-dimethyl-2,5-bis(t-butylperoxy hexane) | 1.0 | 202-209 | 218 |
| 325-27-256 | 2,5-dimethyl-2,5-bis(t-butylperoxy hexane) | 1.0 | 164-170 | 36 |
| 486-17-352 | 2-phenylazo-2,4,4-trimethylvaleramide | 1.8 | 198-203 | 39 |
| 486-17-351 | 2-phenylazo-2,4,4-trimethylvaleramide | 1.8 | 173 | 7.5 |
| 325-23-254 | 2-phenylazoisobutyramide | 2.0 | 203 | 5 |
| 325-18-244 | 2-phenylazoisobutyramide | 2.0 | 173-175 | 2 |

[1] Moles crosslinking agent/36 g. commercial polyethylene (0.96 density; 0.7 melt index) milled on a Brabender Plastograph.

As can readily be seen from Table I, dicumyl peroxide and 2,5-dimethyl-2,5-bis(t-butylperoxy) hexane decompose at a much faster rate than the crosslinking agents of the instant invention. Such rapid decomposition at operable milling temperatures for high density polyethylene causes crosslinking to such an extent in the milling step, that subsequent shaping operations are impossible on a commercial basis. Herein lies the crux of applicants' invention. The crosslinking agents of the instant invention, although they do decompose and cause crosslinking to a minor degree at operable milling temperatures, do not decompose to such an extent that subsequent shaping operations such as extruding and molding are not possible. In fact, such a procedure is a preferred embodiment of the instant invention. The shaping operations can then be followed by a curing step at higher temperatures under static conditions e.g., in an oven wherein the polymer can be fully crosslinked without the accompanying degradation due to shear which occurs in milling.

The amount of phenylazo compound to be used as a crosslinking agent in the instant invention is relatively minor. Amounts in the range 0.01% to 2.0% based on the weight of the polyethylene charge are operable. Amounts in excess of the preferred range are operable but cause imperfections such as bubbles in the polymer due to the nitrogen in the phenylazo compound accumulating and escaping as a gas on decomposition of the compound. A preferred range is 0.01 to 0.5% based on the weight of the polymer charge.

The crosslinked polyethylene produced by the instant invention can be used in many applications wherein polyethylene was used heretofore. Such uses include, bottle making, wire coating, film, and the like. The composition of the present invention is especially useful where good environmental stress cracking properties are a requisite.

Other phenylazo compounds containing a saturated carbocyclic group which are operable as crosslinking agents in the instant invention include 1-phenylazocyclobutyl-1-carboxamide, 1-phenylazocyclopentyl-1-carboxamide, 1-phenylazocyclohexyl-1-carboxamide, 1-phenylazocycloöctyl-1-carboxamide. The method of preparing the novel crosslinking agents of the present invention is disclosed in two copending applications having Serial Numbers 81,687 and 83,646 filed January 10 and 19, 1961, respectively, and both assigned to the same assignee.

More particularly the phenylazo compounds of this invention are prepared as follows:

EXAMPLE 3

1 mole of acetone cyanohydrin and 1 mole of phenylhydrazine are reacted to form 2-phenylhydrazino-isobutyronitrile. The oxidation of this substituted hydrazinonitrile gives 2-(phenylazo)isobutyronitrile. The infra-red spectrum of this compound shows a nitrile band at 2230 cm.⁻¹ (w.), 2 bands at 1365 cm.⁻¹ (m.) and 1385 cm.⁻¹ (m.) corresponding to a tertiary group and 3 bands corresponding to a monosubstituted aromatic ring at 763 cm.⁻¹ (s.), 683 cm.⁻¹ (s.) and 1606 cm.⁻¹ (s.).

EXAMPLE 4

The product of Example 3 is synthesized to the corresponding amide by hydrolyzing 2-(phenylazo)isobutyronitrile in concentrated sulfuric acid.

EXAMPLE 5

To form 2-phenylazo-2,4-dimethylvaleronitrile, 50 gms. of commercially available methylisobutyl ketone and 54 gms. of phenylhydrazine dissolved in 250 ml. of benzene were refluxed and the azeotropic mixture benzene/water was distilled off. When the theoretical amount of water was recovered (about 9 ml.) the benzene was distilled off at normal pressure and the methylisobutyl ketone phenylhydrazone formed was distilled under vacuum yielding 62.5 grams.

To 34.4 grams methylisobutyl ketone phenylhydrazone was added 50 ml. of liquid hydrogen cyanide and 3 drops of concentrated HCl. After reacting for 3 weeks at room temperature, the excess of hydrogen cyanide was distilled off and the crude solid product obtained was crystallized in ether-petroleum ether. 29.4 grams of 2-phenylhydrazino-2,4-dimethylvaleronitrile, having a melting point of 56–57° C. was obtained.

27 grams of the 2-phenylhydrazino-2-4-dimethylvaleronitrile dissolved in 100 ml. chloroform was added with shaking to a saturated solution of bromine in 15% aqueous potassium bromide. The temperature was maintained below 10° C. by addition of ice. After adding an excess of bromine (the aqueous layer became yellow-red) the chloroform layer was separated, washed with aqueous sodium sulfite, aqueous sodium carbonate, and water. The chloroform solution was dried with anhydrous sodium sulfate. The chloroform was evaporated under vacuum and 14.7 grams of 2-phenylazo-2,4-dimethylvaleronitrile was distilled at 72° C. and about 0.003 mm. Hg as a yellow oil.

EXAMPLE 6

To prepare the corresponding amide of Example 5, 2-phenylazo-2,4-dimethylvaleronitrile is hydrolyzed in concentrated surfuric acid.

EXAMPLE 7

To prepare 2-phenylazo-2,4,4-trimethylvaleronitrile, technical diisobutylene is oxidized with chromic acid to obtain methyl neopentyl ketone. To 62 grams of methylneopentyl ketone dissolved in 300 ml. of benzene was added 59 grams of phenylhydrazine. After the addition of phenylhydrazine, the solution was refluxed and the azeotropic mixture benzene/water was distilled off. The benzene was distilled off at normal pressure and the methylneopentyl ketone phenylhydrazone was distilled under vacuum with a yield of 81.4 grams. 50 ml. of liquid hydrogen cyanide and 3 drops of concentrated HCl were added to 80.4 grams of the methylneopentyl ketone phenylhydrazone. After 10 days at room temperature the excess of hydrogen cyanide was distilled off and the crude solid product obtained was crystallized in ether-petroleum ether. A total of 69.3 grams of 2-phenylhydrazino-2,4,4-trimethylvaleronitrile was obtained having a melting point of 89–90° C. To 67 grams of 2-phenylhydrazino-2,4,4-trimethylvaleronitrile dissolved in about 500 ml. of chloroform was added with shaking, a saturated solution of bromine in 15% aqueous potassium bromide. The temperature was maintained below 10° C. by the addition of ice. After adding an excess of bromide, the chloroform layer was separated, washed with aqueous sodium sulfite, aqueous sodium carbonate, and water. The chloroform solution was finally dried with aqueous sodium sulfate. The chloroform was evaporated under vacuum using a film evaporator and 64.8 grams 2-phenylazo-2,4,4-trimethylvaleronitrile was recovered as a viscous yellow liquid.

EXAMPLE 8

To synthesize the corresponding amide of Example 7, a solution of 10 ml. of 2-phenylazo-2,4,4-trimethylvaleronitrile in 10 ml. of concentrated sulfuric acid was made at temperatures maintained below 30° C. After standing overnight at room temperature the viscous solution was poured on ice and the semi-solid product obtained was extracted with ether. The ether solution was dried under anhydrous sodium sulfate and the ether distilled off. The yellow solid obtained was crystallized from n-heptane yielding 2.5 grams of 2-phenylazo-2,4,4-trimethylvaleramide having a melting point of 102–103° C.

EXAMPLE 9

To prepare 2-bromphenylazo-2-isobutyl-4-methylvaleronitrile, 284 grams of commercially available diisobutyl-ketone and 216 grams of phenylhydrazine were mixed according to the procedure in Example 7. 333 grams of diisobutyl ketone phenylhydrazone was obtained. To 116 grams of dibutylketone phenylhydrazone was added 50 ml. of liquid hydrogen cyanide, 3 drops of concentrated HCl. After 1 month at room temperature, the excess of hydrogen cyanide was distilled off and a crude viscous product was obtained. This viscous product was crystallized from n-heptane and 27 grams of 2-phenylhydrazino-2-isobutyl-4-methylvaleronitrile was obtained having a melting point of 80–80.5° C. 20 grams of 2-phenylhydrazino-2-isobutyl-4-methylvaleronitrile were oxidized in chloroform according to the procedure described in Example 7. After evaporation of the chloroform under vacuum, a viscous solid-product was obtained from which 5 grams of 2-bromphenylazo-2-isobutyl-4-methylvaleronitrile was recovered by crystallization in ether-petroleum ether having a melting point of 96–97° C.

EXAMPLE 10

To prepare 2-bromphenylazo-2-isobutyl-4-methylvaleramide, the procedure of Example 8 was followed. A yellow solid of 2-bromphenylazo-2-isobutyl-4-methylvaleramide was obtained in good yield by crystallizing from n-heptane.

EXAMPLE 11

To prepare 1-phenylazo-1-cyanocycloheptane, 37 grams of cycloheptanone and 36 grams of phenylhydrazine were mixed according ot the procedure in Example 5. A nearly quantitative yield of cycloheptanone phenylhydrazone was obtained. By recrystallization, from petroleum ether, 34.7 grams of white cycloheptanonephenylhydrazone melting at 61–63° C. was obtained. To 32.4 grams of cycloheptanone phenylhydrazone dissolved in 50 ml. chloroform, was added 50 ml. of liquid hydrogen cyanide and 3 drops of concentrated HCl. After reacting for 3 weeks at room temperature, the chloroform and the excess of hydrogen cyanide were distilled off and the crude solid obtained was crystallized in ether-petroleum ether to yield 15 grams of 1-phenylhydrazino-1-cyanocycloheptane having a melting point of 88–89° C. A solution of 14.5 grams of 1-phenylhydrazino-1-cycanocycloheptane in chloroform was oxidized with bromine according to the procedure in Example 5. After the oxidation was complete, the chloroform was distilled off under vacuum and 11 grams of 1-phenylazo-1-cyanocycloheptane was obtained.

EXAMPLE 12

To synthesize the corresponding amide of Example 11, a solution of 10 ml. of 1-phenylazo-1-cyanocycloheptane was hydrolyzed in concentrated sulfuric acid to obtain 1-phenylazocycloheptane 1-carboxamide.

EXAMPLE 13

To prepare 2-phenylazo-2-isobutyl-4-methylvaleronitrile, 1 mole of commercially available diisobutylketone was reacted with 1 mole of phenylhydrazine in 400 ml. of benzene. The solution was refluxed and the azeotropic mixture benzene/water was distilled off. The benzene was distilled off at normal pressure and the impure diisobutylketone phenylhydrazone was distilled under vacuum, B.P. 129° C./0.4 mm. Hg. The diisobutylketone phenylhydrazone was reacted for 1 month at room temperature with 150 ml. liquid HCN and 3 drops of concentrated HCl. The excess of hydrogen cyanide was distilled off and a crude viscous product, i.e., 2-phenylhydrazino-2-isobutyl-4-methylvaleronitrile having a melting point of 80–81° C. was obtained. The 2-phenylhydrazino-2-isobutyl-4-methylvaleronitrile was dissolved in 500 ml. chloroform and chlorine was bubbled through the solution for 30 minutes. The chloroformic solution was washed with water, aqueous $Na_2CO_3$, followed by another water wash. The solution was dried under anhydrous $NA_2SO_4$. The chloroform was evaporated under vacuum using a film evaporator, and a yield of 80 grams of 2-phenylazo-2-isobutyl-4-methylvaleronitrile was obtained as a red-yellow liquid product.

EXAMPLE 14

To synthesize the corresponding amide of Example 13, a 10 ml. solution of 2-phenylazo-2-isobutyl-4-methylvaleronitrile was hydrolyzed in concentrated sulfuric acid. A good yield of 2-phenylazo-2-isobutyl-4-methylvaleramide was obtained.

The polyethylene composition after blending with the arylazoalkyl compounds of the instant invention can be shaped prior to curing by methods well known in the art. Such methods include injection molding, blow molding, wire coating, laminating, compression molding, paper coating, vacuum forming, extrusion, and the like.

The polyethylene composition of the instant invention may also contain conventional compounding agents such as pigments, antioxidants, and antistatic and slip agents without departing from the scope of the invention.

We claim:
1. A composition comprising a polymer of ethylene and 0.01 to 2.0% by weight of said polymer of an arylazoalkylcarboxamide of the formula,

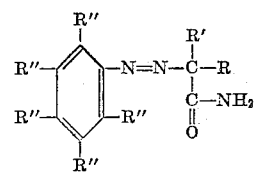

wherein R″ is a member of the group consisting of hydrogen, halogen, alkyl, aralkyl, and aryl and R and R′ are alkyls but not necessarily the same alkyl and can be joined to form a saturated carbocyclic group.

2. The composition according to claim 1 wherein the arylazoalkylcarboxamide is 2-phenylazoisobutyramide.

3. The composition according to claim 1 wherein the arylazoalkylcarboxamide is 2 - phenylazo-2,4,4-trimethylvaleramide.

4. The process which comprises incorporating into a polymer of ethylene at a temperature above its melting point, 0.01 to 2.0% by weight of said polymer of an arylazoalkylcarboxamide of the formula,

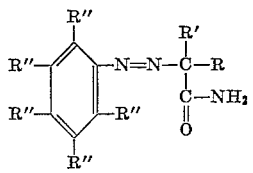

wherein R″ is a member of the group consisting of hydrogen, halogen, alkyl, aralkyl, and aryl and R and R′ are alkyls but not necessarily the same alkyl and can be joined to form a saturated carbocyclic group, forming the polymer into a desired shape and curing the thus-formed polymer at a a temperature of at least 140° C.

5. The process according to claim 4 wherein the arylazoalkylcarboxamide is 2-phenylazoisobutyramide.

6. The process according to claim 4 wherein the arylazoalkylcarboxamide is 2-phenylazo-2,4,4-trimethylvaleramide.

7. The process which comprises incorporating into a polymer of ethylene at a temperature above its melting point, 0.01 to 2.0% by weight of said polymer of an arylazoalkylcarboxamide of the formula,

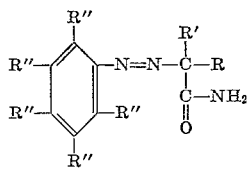

wherein R″ is a member of the group consisting of hydrogen, halogen, alkyl, aralkyl, and aryl and R and R′ are alkyls but not necessarily the same alkyl and can be joined to form a saturated carbocyclic group and thereafter curing the polymer at a temperature of at least 140 C.

8. The process according to claim 7 wherein the arylazoalkylcarboxamide is 2-phenylaziosobutyramide.

9. The process according to claim 7 wherein the arylazoalkylcarboxamide is 2-phenylazo-2,4,4-trimethylvaleramide.

References Cited in the file of this patent

UNITED STATES PATENTS

| | | |
|---|---|---|
| 2,471,959 | Hunt | May 31, 1949 |
| 2,830,978 | Muller et al. | Apr. 15, 1958 |

OTHER REFERENCES

Ford et al., "Journal of the Chemical Society" (London), 1958, pages 1297–8.

Mageli et al., "Modern Plastics," March 1959 (pp. 135–144).